(12) United States Patent
Pei et al.

(10) Patent No.: US 11,428,843 B2
(45) Date of Patent: Aug. 30, 2022

(54) DEVICE FOR PERFORMING TEMPERATURE CORRECTION ON INDUCTION LOGGING TOOL AND DEEP STRATUM ENVIRONMENTAL SIMULATION

(71) Applicant: INSTITUTE OF GEOLOGY AND GEOPHYSICS CHINESE ACADEMY OF SCIENCES, Beijing (CN)

(72) Inventors: Renzhong Pei, Beijing (CN); Zhongxing Wang, Beijing (CN); Qingyun Di, Beijing (CN); Wenxiu Zhang, Beijing (CN); Fei Tian, Beijing (CN); Tianxin Zhang, Beijing (CN)

(73) Assignee: INSTITUTE OF GEOLOGY AND GEOPHYSICS CHINESE ACADEMY OF SCIENCES, Beijing (CN)

( * ) Notice: Subject to any disclaimer, the term of this patent is extended or adjusted under 35 U.S.C. 154(b) by 419 days.

(21) Appl. No.: 16/531,035

(22) Filed: Aug. 3, 2019

(65) Prior Publication Data
US 2020/0319370 A1 Oct. 8, 2020

(30) Foreign Application Priority Data
Apr. 2, 2019 (CN) .......................... 201910261200.5

(51) Int. Cl.
*G01V 3/38* (2006.01)
*G01V 3/28* (2006.01)

(52) U.S. Cl.
CPC . *G01V 3/38* (2013.01); *G01V 3/28* (2013.01)

(58) Field of Classification Search
CPC ......... E21B 47/00; E21B 47/017; G01V 3/28; G01V 3/38; G01V 13/00
See application file for complete search history.

(56) References Cited

U.S. PATENT DOCUMENTS

| 2,821,680 A * | 1/1958 | Slusser | G01N 15/0806 |
| | | | 439/190 |
| 2001/0046811 A1 * | 11/2001 | Fleury | H01R 24/52 |
| | | | 73/38 |

(Continued)

FOREIGN PATENT DOCUMENTS

| CN | 103198748 | * | 4/2013 |
| CN | 103775059 A | * | 5/2014 |

(Continued)

OTHER PUBLICATIONS

Translation of CN103775059B, Secondary heat exchange non-inductive hot air circulating oven (Year: 2012).*

(Continued)

*Primary Examiner* — Steven L Yeninas (57) ABSTRACT

The present invention discloses a device for performing temperature correction on an induction logging tool and deep stratum environmental simulation, including: a box body, configured to accommodate the induction logging tool and a deep stratum environmental simulation system; an air channel, configured to make heated air fill the box body; a circulating fan, configured to make the heated air enter the air channel; an electric heater, configured to heat air; a temperature controller, configured to control power of the electric heater; the deep stratum environmental simulation system, configured to simulate lithological and fluid situations in different stratum environments; a data collection system, configured to collect, store, process, and display a signal in real time; and a control unit, configured to control operation of the entire device. The device for performing temperature correction on an induction logging tool and deep stratum environmental simulation provided in the embodiments of the present invention can accurately simu- (Continued)

late a complex environment of a deep stratum, thereby increasing measurement precision.

6 Claims, 3 Drawing Sheets

(56) References Cited

U.S. PATENT DOCUMENTS

| | | | | |
|---|---|---|---|---|
| 2009/0084189 | A1* | 4/2009 | McMechan | G01N 3/12 |
| | | | | 73/803 |
| 2017/0205388 | A1* | 7/2017 | Thomas | E21B 33/14 |
| 2018/0246999 | A1 | 8/2018 | Feng et al. | |
| 2019/0360278 | A1* | 11/2019 | Chu | E21B 47/12 |
| 2020/0217193 | A1* | 7/2020 | Li | E21B 49/00 |

FOREIGN PATENT DOCUMENTS

| | | | |
|---|---|---|---|
| CN | 103775059 | A | 5/2014 |
| CN | 107229083 | A | 10/2017 |
| CN | 103775059 | * | 9/2018 |

OTHER PUBLICATIONS

Translation of CN103198748A, Multifunctional resistivity log experimental device (Year: 2013).*

* cited by examiner

DEVICE FOR PERFORMING TEMPERATURE CORRECTION ON INDUCTION LOGGING TOOL AND DEEP STRATUM ENVIRONMENTAL SIMULATION

TECHNICAL FIELD

The present invention relates to the field of well logging equipment, and in particular, to a device for performing temperature correction on an induction logging tool and deep stratum environmental simulation.

BACKGROUND ART

The induction logging tool is an instrument for testing the hydrocarbon reservoir in the oil well according to the mutual inductance principle of alternating current. Specifically, a transmitting coil antenna and a receiving coil antenna of the induction logging tool are both in the well, and the alternating current in the transmitting coil antenna generates a varying magnetic field. The varying magnetic field induces to generate eddy current in the stratum surrounding the well, and an electromotive force is induced in a receiving coil. The magnitude of the induced electromotive force is related to the eddy current, that is, to the conductivity of the stratum. A larger conductivity of the stratum indicates a larger eddy current and a larger electromotive force in the receiving coil. Through the instrument scale, the induced electromotive force measured in the receiving coil can be converted into conductivity of the stratum and the conductivity of the stratum is related to the hydrocarbon reservoir.

The induction logging tool usually works in a high-temperature, high-pressure, high-vibration underground environment, especially as the depth of well exploration increases, the logging tool is lowered to a well with a depth of thousands of meters and a working environment temperature of up to 120-200° C. Especially under conditions of a high-resistance stratum, the influence of temperature changes on the measurement results of induction logging tools is particularly significant. The influence of temperature conditions on induction logging is mainly reflected in two aspects: the temperature deformation of the coil system and the temperature drift of the electronic circuit. The characteristic of varying with the temperature of a measurement signal is a comprehensive reflection of factors of the two aspects.

To eliminate the temperature effect, the induction logging tool usually obtains the quantitative relationship between the temperature and the temperature effect through the pre-temperature experiment method, and then compensates for the temperature effect during use by data processing. This process is referred to as temperature correction. The accuracy of temperature calibration determines the repeatability, stability, and quality of the log presentation. In the prior art, there is no high-precision temperature correction device and method applied to the induction logging tool.

Further, the conductivities of different strata of different properties, such as clastic rocks, carbonate rocks, and volcanic rocks, in deep high temperature environments is significantly different from that of shallow environments, and in addition, a conductivity difference is caused by properties of fluids in the deep stratum. Therefore, the shallow stratum environment at normal temperature cannot directly replace the deep high-temperature stratum environment, and the conventional laboratory simulation method has insufficient understanding of the impact of the difference on the experimental results. Shallow strata are used in the simulation of stratum environments. At the same time, due to the complex lithology of the deep underground environment, the test instruments usually used in laboratories are significantly different from the actual deep high temperature environment and complex lithology environment, resulting in significant measurement errors in the measurement results of the induction logging tool.

SUMMARY OF THE INVENTION

With respect to the unsolved problem in the prior art, one aspect of the embodiments of the present invention provides a device for performing temperature correction on an induction logging tool and deep stratum environmental simulation, comprising: a box body, configured to accommodate the induction logging tool and a deep stratum environmental simulation system; an air channel, disposed on an inner wall of the box body, and configured to make heated air fill the box body, wherein a plurality of vents are disposed on a wall of the air channel, and configured to make the heated air enter the box body; a circulating fan, wherein an air outlet of the circulating fan is connected to the air channel for making the heated air enter the air channel; an electric heater, disposed at an air inlet of the circulating fan for heating air; a temperature controller, configured to control power of the electric heater, to adjust a temperature inside the box body by using the heated air; the deep stratum environmental simulation system, comprising a wellbore hole simulator and a stratum core simulation module for simulating lithological and fluid situations in different stratum environments; a data collection system, configured to collect, store, process, and display a signal in real time; and a control unit, configured to control operation of an entire device.

Optionally, the box body comprises a box body thermal insulation layer, wherein the box body thermal insulation layer comprises: a shell, wherein the shell is a glass steel insulation board shell; a thermal insulation body, comprising an aluminum silicate fiber layer, an aluminum silicate board layer, and a ceramic layer in sequence from outside to inside.

Optionally, the device further comprises a fiber frame, wherein the shell of the box body thermal insulation layer is fastened on the fiber frame by using a nylon bolt.

Optionally, the device further comprises a box door, movably covered on an outlet of the box body, wherein the cover board is in a hand-lift-to-open mode, wherein the outlet of the box body is used for the induction logging tool to enter and leave.

Optionally, the device further comprises an automatic valve, communicated with interior and exterior of the box body, for being opened under control of the temperature controller, so that cold air outside the box body enters the box body and/or hot air inside the box body is discharged outside the box body; and a manual valve, configured to manually control an open degree of the automatic valve, to control an air inlet volume of cold air and/or an air outlet volume of hot air.

Optionally, the box body comprises a front box body and a rear box body, a movable adjustment board and a fixed adjustment board are disposed between the front box body and the rear box body, the movable adjustment board and the fixed adjustment board form an air outlet hole and an air inlet hole, and sizes of the air outlet hole and the air inlet hole can be adjusted by segments.

Optionally, the device further comprises a U-shaped support, mounted on a bottom surface inside the box body, for supporting the induction logging tool; and a plurality of guide rollers, mounted in a groove of the U-shaped support, wherein the plurality of guide rollers is disposed along a length direction of the box body in the U-shaped support at equal intervals for the induction logging tool to enter and leave the box body.

Optionally, the device further comprises a test hole, disposed on a left side of the box body for a test pipeline to pass through; and a plurality of small line test holes, disposed on a side wall of the box body, for the test pipeline to pass through.

Optionally, the device further comprises a silicon oil pipeline outlet, disposed on a side wall of the box body, for a silicon oil pipeline to pass through during an oil-containing test of the induction logging tool.

Optionally, the device further comprises a security device, and the security device comprises a grounding apparatus, configured to ground the device; an over-temperature protection digital indicator, configured to display a temperature inside the device; a heating short-circuit protection unit, configured to perform short-circuit protection; a circulating fan current-overload protection unit, configured to cut off power supply of the correction device during current-overload of the circulating fan; a phase sequence protector, configured to perform protection after a power supply phase sequence is inversely connected; and an alarm unit, configured to issue an alarm when the device has a fault, and analyze a fault cause after the device has the fault.

The device for performing temperature correction on an induction logging tool and deep stratum environmental simulation provided in the embodiments of the present invention solves, on one hand, the problem that the electric heater is easily overheated and the device has low safety performance. At the same time, the internal temperature of the device is made more constant by speeding up the air circulation inside the device. The present invention can provide a uniform temperature and meet the requirements of the overall temperature test of the induction instrument. On the other hand, the device for performing temperature correction on an induction logging tool and deep stratum environmental simulation provided in the present invention can accurately simulate the complex environment of the deep stratum, so that the test environment of the induction logging tool is consistent with the actual deep high temperature environment and complex lithology environment, thereby increasing measurement precision.

BRIEF DESCRIPTION OF THE DRAWINGS

In order to more clearly illustrate the technical solutions in the embodiments of this application, the drawings that need to be used in the description of the embodiments will be briefly described below. It is obvious that the drawings in the following description are some embodiments of the present invention. A person of ordinary skill in the art may further derive other drawings from these drawings without inventive efforts.

DETAILED DESCRIPTION OF THE INVENTION

To make the objectives, technical solutions, and advantages of the embodiments of this application clearer, the technical solutions in the embodiments of the present invention will be clearly and completely described below with reference to the accompanying drawings in the embodiments of the present invention. It is obvious that the described embodiments are merely some of the embodiments of the present invention rather than all the embodiments. Based on the embodiments of the present invention, all other embodiments that are obtained by a person of ordinary skill in the art without inventive efforts fall within the protection scope of the present invention.

In the description of the present invention, it should also be noted that the terms "disposed", "coupled", and "connected" should be understood broadly unless explicitly stated otherwise. For example, "connected" may indicate a direction connection, or an indirect connection through an intermediate medium, and may indicate the internal connection between two elements. For a person of ordinary skill in the art, the specific meanings of the above terms in the present invention may be understood on a case-by-case basis.

In this specification, relational terms such as first and second are used merely to distinguish one entity or operation from another entity or operation, and do not necessarily require or imply existence of any such actual relationship or sequence. Furthermore, the term "include", "comprise" or any other variation thereof is intended to encompass a non-exclusive inclusion, so that a process, method, article, or device that includes a series of elements includes not only those elements but also other elements not explicitly listed, or elements inherent to such a process, method, article or device. In a case without more limitations, an element that is defined by the phrase "comprising a . . . " does not exclude the existence of other same elements in the process, method, article, or device that includes the element.

Figure 1:
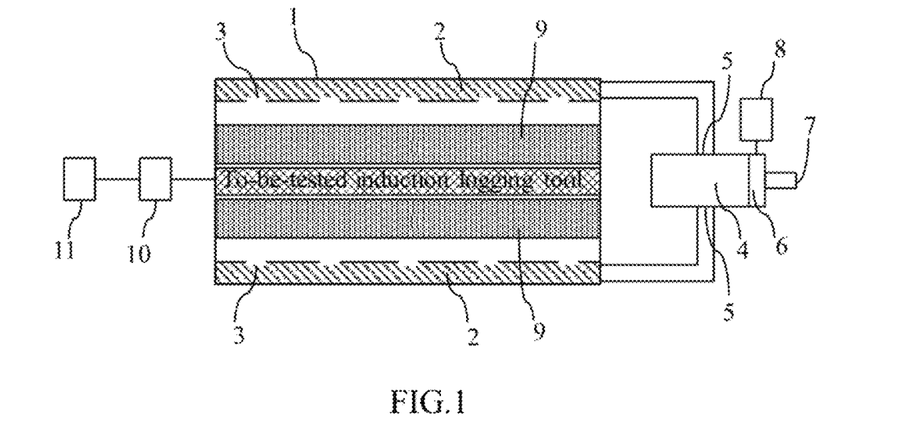
FIG. 1 is a schematic structural diagram of a device for performing temperature correction on an induction logging tool and deep stratum environmental simulation provided in a first embodiment of the present invention.
Figure 2:
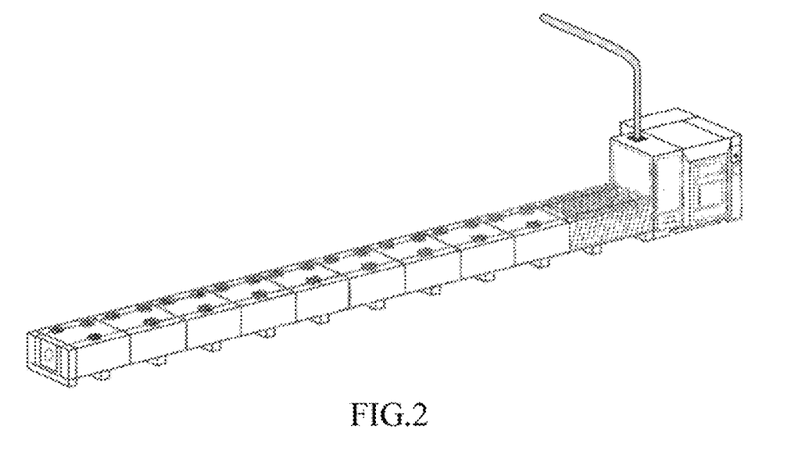
FIG. 2 is a schematic diagram of appearance of a device for performing temperature correction on an induction logging tool and deep stratum environmental simulation provided in the first embodiment of the present invention.

As shown in FIG. 1, an embodiment of the present invention discloses a device for performing temperature correction on an induction logging tool and deep stratum environmental simulation. The device includes:

a box body 1, configured to accommodate the induction logging tool and a deep stratum environmental simulation system;

an air channel 2, disposed on an inner wall of the box body, and configured to make heated air fill the box body, where a plurality of vents 3 are disposed on a wall of the air channel, and configured to make the heated air enter the box body;

a circulating fan 4, where an air outlet 5 of the circulating fan is connected to the air channel for making the heated air enter the air channel;

an electric heater 6, disposed at an air inlet 7 of the circulating fan for heating air;

a temperature controller 8, configured to control power of the electric heater, to adjust a temperature inside the box body by using the heated air;

the deep stratum environmental simulation system 9, including a wellbore hole simulator and a stratum core simulation module for simulating lithological and fluid situations in different stratum environments;

a data collection system 10, configured to collect, store, process, and display a signal in real time; and a control unit 11, configured to control operation of an entire device.

The parts are specifically described below:

The box body 1 is configured to accommodate the induction logging tool and the deep stratum environmental simulation, and is made of a material without electromagnetic induction.

In an embodiment of the present invention, the material without electromagnetic induction is a non-metal material. Preferably, the non-metal material includes woods, engineering plastics, engineering ceramics and non-metal thermal insulation materials. To make the box entirety have lower mechanical deformation and better reliability, in this embodiment of the present invention, the innermost material of the box body is preferably made of engineering ceramics.

In an embodiment of the present invention, the box body further includes therein a box body thermal insulation layer for keeping a temperature inside the box body, and the thermal insulation layer includes an aluminum silicate fiber layer, an aluminum silicate board layer, and a ceramic layer in sequence from outside to inside.

In an embodiment of the present invention, the box body includes engineering ceramics, an aluminum silicate board, aluminum silicate fibers, and a glass steel insulation board in sequence from inside outside. The box body adopting the structure in this embodiment of the present invention not only has a simple structure, but also has a good thermal insulation effect and does not cause electromagnetic interference. In an embodiment of the present invention, the internal dimensions of the box body are length×width×height: 900×350×350 (cm), and the appearance dimensions of the box body are length×width>height: 1250×500×500 (cm).

In an embodiment of the present invention, to ensure the test accuracy, it is necessary to maintain the stability of the test structure all the time. The device for performing temperature correction on the induction logging tool and deep stratum environmental simulation further includes a fiber frame, and the box body is fastened on the fiber frame by using a non-magnetic nylon bolt.

In an embodiment of the present invention, to facilitate the pick-and-place of the test instrument and the deep stratum simulation system, the box body is further provided with a box door covered on the outlet of the box body and is movable. Preferably, to prevent the box body from being overheated, a cover board is disposed on an outermost layer of the test box body as a box door. Further, to facilitate use, the cover board is in a hand-lift-to-open mode. The material of the box door in this embodiment of the present invention is the same as that of the box body, not only has a good strength, but also is not easily deformed after long-term use. In addition, a thermal stress deformation caused by the difference in material between the box door and the box body is avoided when the temperature changes.

In another embodiment of the present invention, to further enhance the capability of adjusting the temperature inside the box body, the box body includes a front box body and a rear box body; a movable adjustment board and a fixed adjustment board are disposed between the front box body and the rear box body; the movable adjustment board and the fixed adjustment board form an air outlet hole and an air inlet hole; preferably, sizes of the air outlet hole land the air inlet hole may be adjusted by segments.

In another embodiment of the present invention, the box body is in a structure of a plurality of segments. By using the structure of a plurality of segments, not only the capability of adjusting the temperature in the box body can be further enhanced, but also the test for logging tools of different models is facilitated. Further, a movable adjustment board and a fixed adjustment board are disposed between the plurality of segments of box body. The movable adjustment board and the fixed adjustment board form an air outlet hole and an air inlet hole. Preferably, sizes of the air outlet hole and the air inlet hole may be adjusted by segments.

In another embodiment of the present invention, a test hole is disposed on the box body. Preferably, the test hole is disposed on a side wall of the box body for a test pipeline to pass through. To reduce interference brought by the test hole to the test, preferably, the test hole has a diameter of 30 to 100 mm In another embodiment of the present invention, a silicon oil pipeline outlet is disposed on the box body. Preferably, the silicon oil pipeline outlet is disposed on a side wall of the box body for the silicon oil pipeline to pass through during an oil-containing test of the induction logging tool.

The air channel 2 is disposed on an inner wall of the box body, and configured to make heated air fill the box body, where a plurality of vents 3 are disposed on a wall of the air channel, and configured to make the heated air enter the box body 1.

In an embodiment of the present invention, to increase the heat exchange efficiency inside the box body, the air channel includes an air inlet channel and an air return channel, and the air channel is connected to the circulating fan; during work, the air inlet channel can transfer heated air to the inside of the box body, and the air return channel can transfer cold air completing heat exchange back to the circulating fan. The temperature and air pressure in the box body can reach the preset values as soon as possible by using the air inlet channel and the air return channel.

Preferably, the air inlet channel is disposed on inner walls of the left and right sides of a working area of the box body, and the air return channel is located on a bottom inner wall of the working area of the box body. To ensure the uniformity of heating while taking into account the heating speed, in the present invention, a plurality of channels is arranged side by side, and a plurality of vents are disposed on walls of the air channels.

The circulating fan 4 is connected to the air channel 2 for making the heated air enter the air channel 2.

To reduce the influence of the circulating fan on the test result, in this embodiment of the present invention, the distance between the circulating fan and a temperature box is set to be greater than a certain distance, and after test, when the distance is greater than 1.5 meters, the influence of the circulating fan on the test result may be ignored. Further, the circulating fan is made of a material having relatively small electromagnetic interference. Preferably a material without electromagnetic induction is used, and further preferably, an electromagnetic shielding apparatus is additionally disposed outside the circulating fan.

The electric heater 6 is disposed at an air inlet 7 of the circulating fan for heating air.

In an embodiment of the present invention, the heater performs heating by using circulating air. Preferably, to make the temperature uniformity better, the heater uses an oil bath heating type heater. To reduce the influence of the exhaust gas on the test precision and to better protect the environment, the heater of the present invention is provided with a vent channel for discharging exhaust gas generated during oil heating.

The temperature controller 8 is configured to control power of the electric heater 6, to adjust a temperature inside the box body 1 by using the heated air.

In this embodiment of the present invention, to avoid overheating of the heater and increase the safety performance of the device, the circulating fan is interlocked with the heater and forms a temperature closed loop control system together with the temperature controller, and the interlocking is specifically: When work starts, first the circulating fan is started, and then the electric heater is started; when the work is stopped, the electric heater is disconnected first, and then the circulating fan is turned off in a delay manner. Experiments show that the use of the interlocking not only can increase the safety performance of the device, but also can speed up the air circulation inside the device, and this helps the internal temperature of the device to be constant.

The device for performing temperature correction on an induction logging tool and deep stratum environmental simulation of the present invention further includes a test instrument, which is used for parameters such as temperature and temperature uniformity in the temperature box, and determining, according to the parameters, whether the current environment reaches the preset values.

In an embodiment of the present invention, the test instrument includes a temperature sensor. Preferably, to increase the precision of the temperature sensor, the temperature sensor is a platinum resistance temperature sensor. The platinum resistance temperature sensor is a temperature sensor whose resistance changes with the change of the ambient temperature, and has the advantages of good stability, high precision, wide temperature range and fast response. Preferably, the platinum resistance temperature sensor adopts an industrial grade A Pt100 platinum resistor, which has good precision, so that the problem of hysteresis of temperature control is effectively solved. The problem of hysteresis of temperature control is one of the sources of temperature correction errors.

Further, to eliminate the nonlinear relationships between the platinum resistor resistance and the temperature that are ubiquitous in the conventional temperature measurement method, the present invention adopts a four-wire temperature measurement system. The temperature box is evenly equipped therein with 8 temperature sensors for measuring the distribution and uniformity of the temperature fields to form a complete temperature field distribution in the box. Further preferably, the present invention provides a 9-channel temperature recorder for the collection of temperature sensor data, ensuring real-time recording of temperature for subsequent analysis of the data.

In an embodiment of the present invention, the test instrument further includes a pressure sensor. Preferably, to increase the precision of the pressure sensor, the pressure sensor is a polysilicon pressure sensor. The polysilicon pressure sensor has the advantages such as high working temperature, small temperature drift, and high sensitivity. To better meet the special environmental requirements of simulating the stratum high temperature and high pressure, the pressure sensor uses the polysilicon pressure sensor; silicon dioxide is used as the medium for isolation, and a working temperature thereof is 20-250° C., and the working pressure is 2-100 MPa. The temperature drift is less than $4\times10^{-4}$ FS/° C. to meet the measurement requirements of the device.

Figure 3:
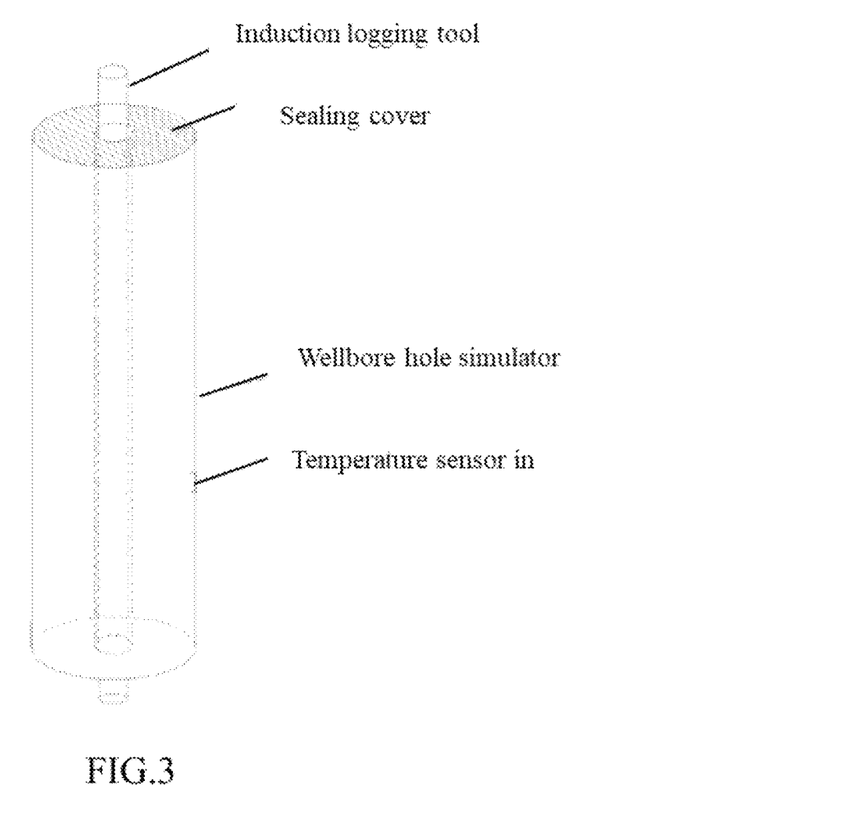
FIG. 3 is a schematic structural diagram of a device for deep stratum environmental simulation provided in the first embodiment of the present invention.

The deep stratum environmental simulation system 9 includes a wellbore hole simulator and a stratum core simulation module for simulating lithological and fluid situations in different stratum environments.

The deep stratum environmental simulation system can realize the function of simulating the response to logging of the induction logging tool in the deep stratum complex lithology environment and under different fluid (oil, water) saturation conditions. The system is located inside the box body and outside the to-be-tested induction logging tool. As shown in FIG. 3, the system is formed by a wellbore hole simulator and a stratum core simulation module, and is not made of a material without electromagnetic induction.

In an embodiment of the present invention, the wellbore hole simulator is a cylindrical structure having a cylinder cover, a cylinder bottom, an inner wall and an outer wall, where the cylinder cover is an annular sealing cover, and the center of the annular sealing cover is a void, and the diameter of the central void is the same as the diameter of the inner wall. The inner wall and the outer wall are of concentric circular structures having different diameters, and comprehensively considering the structure and geometrical dimensions of the to-be-tested logging tool, and the mounting convenience of the core and the effective stratum radial measurement range, preferably, the outer wall has a diameter of 300-500 cm, the inner wall has a diameter of 250-500 cm, and a length of 1500-2000 cm. The wellbore body is connected at the top end to the sealing cover. Further, the connection is sealed. In an embodiment, the sealing connection is achieved by bolts. A temperature sensor is mounted on the inner wall of the wellbore body for measuring the temperature of the wellbore hole simulator in real time. Preferably, to more accurately measure the real-time temperature of the wellbore, a plurality of temperature sensors is disposed. Specifically, four temperature sensors are disposed per meter respectively on upper, lower, left and right sides of the wellbore body.

Further, to increase the convenience of mounting the stratum core in the wellbore hole simulator, a stratum core simulation module mounting apparatus is disposed on the inner wall of the wellbore hole simulator, and the mounting apparatus can fix the stratum core simulation module on the inner wall of the wellbore hole simulator. To increase the convenience of mounting and demounting, in an embodiment of the present invention, the mounting apparatus is a non-magnetic hook, and the non-magnetic hooks are respectively disposed on the inner wall of the wellbore hole simulator and the stratum core simulation module, which may be fixedly connected through the hooks. In an embodiment of the present invention, considering that the wellbore hole simulator needs to be placed in a temperature box horizontally, the mounting module may be further configured to implement a fixing function by using a fixing clamping slot.

The stratum core simulation module is an annular apparatus, and a stratum core is placed therein. According to experimental experiments, a real stratum may be simulated by replacing cores with different lithologies and different penetration rates. Further, the core needs to be processed into an annular shape. A hollow diameter of the annular core cannot be less than an outer diameter of the induction logging tool. In an embodiment of the present invention, the stratum core simulation module is provided with a hook. The hook may be hooked into a mounting hole on an inner wall of the wellbore hole simulator. In this way, the stratum core simulation module is mounted in the wellbore hole simulator.

In an embodiment of the present invention, after the stratum core simulation module in which the core is placed is mounted into the wellbore hole simulator, a stratum fluid may be injected into the wellbore hole simulator. According to experimental experiments, a real stratum fluid may be simulated by replacing fluids with different properties and different saturations. After injection is completed, the sealing cover is closed, and is screwed for sealing by using a sealing bolt, to ensure that the stratum fluid does not leak out. Preferably, to further simulate environmental pressure of a deep stratum, the position of the sealing cover may be adjusted by using a sealing bolt. The sealing cover is moved towards the inside to apply pressure to the fluid in the wellbore hole simulator, so that pressure in the wellbore hole simulator can be adjusted. The real-time pressure in the wellbore hole simulator can be measured in real time by using a pressure sensor disposed in a wellbore.

In an embodiment of the present invention, a temperature sensor mounted on an inner wall of the annular hollow wellbore body also uses an industrial grade A Pt100 platinum resistance temperature sensor, and also uses a four-wire temperature measurement system, to ensure real-time, accurate, and stable measurement of the temperature of the wellbore hole simulator.

In an embodiment of the present invention, the stratum core simulation module can simulate downhole stratum environments with different lithologies and fluids. The stratum core simulation module is mounted on an inner wall of the wellbore hole simulator. According to experimental requirements, when the stratum lithology needs to be simulated, the stratum core simulation module may replace cores or core combinations with different lithologies and petrophysical properties, to simulate the stratum lithology. When the stratum fluid needs to be simulated, fluids with different properties and saturations may be replaced in the stratum core simulation module.

The device for performing temperature correction on an induction logging tool and deep stratum environmental simulation of the present invention further includes a heat source for heating an entire temperature box. By heating the entire temperature box by using the heat source, stability of a test device can be increased. To further increase the stability of temperature, in this embodiment of the present invention, the heat source is a thermocouple.

The device for performing temperature correction on an induction logging tool and deep stratum environmental simulation of the present invention further includes a control unit 11. The control unit is configured to control operation of an entire device.

In an embodiment of the present invention, to simplify complexity of operation and reduce influence of an operating unit on test results, in an embodiment of the present invention, the control unit is an integrated control cabinet, and further, a magnetic shielding shell is disposed on the integrated control cabinet.

In an embodiment of the present invention, the control unit includes a comprehensive display control system, and uses an LCD liquid crystal display touch control screen, which can display a setting parameter, time, and a working status of a heater. Preferably, the control system has test automatic operation and PID automatic adjustment functions. Further preferably, the control system can automatically combine working conditions of subsystems such as natural temperature reduction and heating subsystems, so as to ensure high-precision control within an entire temperature range, and also achieve objectives of energy saving and noise reduction. In this embodiment of the present invention, the air control manner is to perform forced circulation ventilation, to make the system automatically implement temperature control by means of BTC. Specifically, when the system continuously works, the system automatically controls outputs of the heater by using a result output by PID automatic operation according to a set temperature point, to finally achieve a dynamic balance. In this embodiment of the present invention, the instrument control precision is less than 0.1° C.

The device for performing temperature correction on an induction logging tool and deep stratum environmental simulation of the present invention further includes a data collection system 10, configured to collect, store, process, and display a signal in real time.

In an embodiment of the present invention, the data collection system is connected to the to-be-tested induction logging tool in the box body through a cable, for collecting, storing, processing, and displaying environmental signals such as temperature and pressure signals and data signals such as induction logging conductivity signals in real time. In an embodiment of the present invention, the data collection system includes three parts: a data collection hardware platform, a data collection and control software platform, and a data processing interpretation platform. Further, the cable is provided with a magnetic shielding shell.

In an embodiment of the present invention, the data collection hardware platform is placed in a logging data collection box body, and is formed by a data collection module and a data calculation module, to implement real-time collection, interpretation, and processing of logging data signals. The data collection hardware platform is formed by a Compact PCI bus system, an I/O board, a signal preprocessing board, and a signal collection board. The Compact PCI bus has advantages such as excellent performance, being hot-pluggable, good openness, and high reliability. The data collection board mainly completes collection of various uploaded signals, including A/D collection function, telemetry signal collection function, hot-plugging function, counter function and the like. The collection board is a comprehensive logging data collection and processing board, and is implemented by using DSP and FPGA technologies, and performs communication with computer host data by using a CPCI bus. Preferably, an appearance size of the logging data collection box body is (width×height× depth): 200-500 mm×100-300 mm×200-600 mm In an embodiment of the present invention, the device for performing temperature correction on an induction logging tool and deep stratum environmental simulation further includes:

an automatic valve, communicated with interior and exterior of the box body, for being opened under control of the temperature controller, so that cold air outside the box body enters the box body or hot air inside the box body is discharged outside the box body; and a manual valve, configured to manually control an open degree of the automatic valve, to control an air inlet volume of cold air or an air outlet volume of hot air.

In a preferred embodiment of the present invention, an automatic valve and a manual valve are disposed at the same time. A combination of a manual valve and an automatic valve can improve flexibility of the device during use when the high precision of the device is ensured to the greatest extent.

In an embodiment of the present invention, the device for performing temperature correction on an induction logging tool and deep stratum environmental simulation further includes:

a U-shaped support, mounted on a bottom surface inside the box body, for supporting or fixing a to-be-tested induction logging tool; and a guide roller, where there is a plurality of guide rollers, mounted in a groove of the U-shaped support; the guide rollers are disposed along a length direction of the box body in the U-shaped support at equal intervals, for the to-be-tested induction logging tool to enter and leave the device for performing temperature correction on an induction logging tool and deep stratum environmental simulation. The guide rollers are mounted, so that the to-be-tested instrument enters and leaves the box body conveniently. In this embodiment of the present invention, after the guide rollers are mounted, the full length of the internal bottom of the box body can bear a load of 1500 Kg or more. In another embodiment of the present invention, a small track car is equipped in the box body to meet the load bearing requirement of the box body.

A match between the U-shaped support and the guide roller can ensure the precision of the relative position of the to-be-tested induction logging tool, to reduce errors brought thereby.

In an embodiment of the present invention, the device for performing temperature correction on an induction logging tool and deep stratum environmental simulation further includes:

a security device, configured to protect the device from being damaged during a fault. The security device includes an over-temperature protector, configured to display a temperature inside the device; a heating short-circuit protection unit, configured to perform short-circuit protection on the device; a circulating fan current-overload protection unit, configured to cut off power supply of the correction device during current-overload of the circulating fan; a phase sequence protector, configured to perform protection after a power supply phase sequence is inversely connected; and an alarm unit, configured to issue an alarm when the device for performing temperature correction on an induction logging tool and deep stratum environmental simulation has a fault, and analyze a fault cause after the device for performing temperature correction on an induction logging tool and deep stratum environmental simulation has the fault.

Because the working temperature of the device for performing temperature correction on an induction logging tool and deep stratum environmental simulation of the present invention is relatively high, the security device requires relatively high reliability, and requires capability of long-time work in high-temperature and high-pressure environments.

In an embodiment of the present invention, to facilitate processing a test result, the modules of the device all have independent working time accumulative timing functions.

In an embodiment of the present invention, to reduce influence on the test result, the distance from necessary metal devices including the control cabinet, circulating fan, electric heater and the like to the end portion of the non-inductive test box is greater than a particular distance. Upon test, when the distance is greater than 1.5 meters, the influence of the device on the test result may be ignored.

Experiments prove that by using the device for performing temperature correction on an induction logging tool and deep stratum environmental simulation in this embodiment of the present invention, the following parameters can be achieved:

Temperature range: R.T +20° C. to 230° C.;
Programmable temperature control range: room temperature to 230° C. (random setting may be performed);
Temperature fluctuating degree: ±0.1° C.;
Temperature uniformity: ±3° C. (zero load≤175 degrees);
Temperature increase rate: increase to 180° C. within 2-4 hours; and
Temperature decrease rate: decrease to room temperature within 2-8 hours.

The ±0.1° C. temperature fluctuating degree has completely satisfied the requirement of the induction logging tool for the temperature correction device. The relatively large temperature range and the relatively high temperature increase and decrease rates ensure the application range of the device.

Another embodiment of the present invention further provides a method for performing temperature correction on an induction logging tool based on the device:

S1: according to experimental requirements, a stratum core or core combination with a specific lithology and specified fluid saturation is selected, and the stratum core or core combination is placed into a stratum core simulation module of a deep stratum environmental simulation system; the stratum core simulation module is placed into an annular hollow wellbore hole simulator, and the wellbore hole simulator is sealed;

S2: a to-be-tested induction logging tool is placed into a hollow space of the annular hollow wellbore hole simulator;

S3: the wellbore hole simulator is placed into a box body;

S4: test parameters, including a preset temperature measurement point and induction logging tool measurement data of the measurement point, are set;

S5: the device is started, wherein the system operates according to three processes: temperature increase, constant temperature, and temperature decrease according to a set temperature parameter;

S6: a data collection system automatically collects the device and stores a temperature of each temperature measurement point and corresponding logging tool measurement data, to obtain apparent conductivity under a temperature-varying condition;

S7: a processing interpretation platform calculates a temperature correction coefficient according to logging conductivity data and temperature pressure data, to implement automatic temperature compensation correction on the logging tool, and display and store a correction result; and S8: the apparatus is switched off, and after being fully cooled, the wellbore hole simulator and the core in the stratum core simulation module are taken out.

The temperature correction device for an induction logging tool provided in the embodiments of the present invention solves the problem that the electric heater is easily overheated and the device has low safety performance At the same time, the internal temperature of the device is made more constant by speeding up the air circulation inside the device.

The data collection system equipped in the present invention can collect and store logging tool measurement data in real time. There is a variety of data collection interfaces, which can satisfy requirements of a plurality of induction logging tools such as single inductance, dual inductance, array inductance, and three-dimensional (three-component) inductance induction logging tools. The present invention is particularly designed with respect to the complex stratum lithology, and can simulate the stratum environment under different temperature conditions, different lithologic media and different fluid (oil and water) saturations, so as to quickly calibrate the temperature and simulate the high temperature environment of the deep stratum (150-220° C.), and provides modification suggestions for development and research of the logging tool, to accelerate the development and research progress.

Although preferred embodiments of the present invention have been described, once a person skilled in the art learns a basic inventive concept, other changes and modifications may be made to these embodiments. Therefore, the appended claims are intended to be interpreted as covering the preferred embodiments and all changes and modifications falling within the scope of the present invention.

Apparently, a person skilled in the art may make various modifications and variations to the present invention without departing from the spirit and scope of the present invention. In this way, if these modifications and variations of the present invention fall within the scope of the claims and equivalent technologies thereof of the present invention, the present invention is also intended to include these modifications and variations.

What is claimed is:

1. A device for performing temperature correction on an induction logging tool and deep stratum environmental simulation, comprising:
    a box body (1), configured to accommodate the induction logging tool and a deep stratum environmental simulation system (9), wherein the box body (1) is made of a material without electromagnetic induction and the deep stratum environmental simulation system (9) comprises a wellbore hole simulator and a stratum core simulation module for simulating lithological and fluid situations in different stratum environments;
    an air channel (2), disposed on an inner wall of the box body (1),wherein a plurality of vents (3) are disposed on a wall of the air channel, and configured to make the heated air enter the box body (1);
    a circulating fan (4) connected to the air channel (2), wherein an air outlet (5) of the circulating fan is connected to the air channel (2) for making the heated air enter the air channel (2);
    an electric heater (6), disposed at an air inlet (7) of the circulating fan (4) for heating air;
    a temperature controller (8), configured to control power of the electric heater (6), to adjust a temperature inside the box body (1) by using the heated air;
    a data collection system (10), configured to collect, store, process, and display a signal in real time; and
    a control unit (11), configured to control operation of the device.

2. The device for performing temperature correction on an induction logging tool and deep stratum environmental simulation according to claim 1, characterized in that the box body (1) is fastened on a fiber frame using a nylon bolt.

3. The device for performing temperature correction on an induction logging tool and deep stratum environmental simulation according to claim 1, characterized in that the air channel (2) comprises an air inlet channel and an air outlet channel to increase heat efficiency inside the box body (1).

4. The device for performing temperature correction on an induction logging tool and deep stratum environmental simulation according to claim 3, the air inlet channel of the air channel (2) is configured to transfer heated air to inside of the box body (1).

5. The device for performing temperature correction on an induction logging tool and deep stratum environmental simulation according to claim 3, wherein the air return channel of the air channel (2) is configured to transfer cold air completing heat exchange back to the circulating fan (4).

6. The device for performing temperature correction on an induction logging tool and deep stratum environmental simulation according to claim 5, wherein the air inlet channel of the air channel (2) is disposed on inner walls of the left and right sides of a working area of the box body (1), and the air return channel is located on a bottom inner wall of the working area of the box body (1).

* * * * *